United States Patent Office 3,397,114
Patented Aug. 13, 1968

3,397,114
INTEGRAL NUCLEAR REACTOR-HEAT
EXCHANGER ARRANGEMENT
Thomas Deighton, London, England, assignor to Babcock & Wilcox, Limited, London, England, a corporation of Great Britain
Filed July 5, 1966, Ser. No. 562,626
10 Claims. (Cl. 176—54)

ABSTRACT OF THE DISCLOSURE

An integral nuclear reactor for marine service comprising an upright closed pressure vessel having a substantially cylindrically shaped body portion and removable end portion. The vessel, which houses the reactor core and heat exchanger, is adapted to have a primary coolant circulated through the core. Heat generated by the core is transferred to secondary coolant passing through the heat exchanger. The secondary coolant passes from outside the vessel into the heat exchanger via a ring header coaxially disposed intermediate the end and body portions. The ring has a stepped cross-section to accommodate lateral thrust problematic to marine reactors. Conduits passing through openings formed radially of the ring conduct secondary coolant into the reactor vessel for flow through the heat exchanger and out of the vessel after flowing through the exchanger.

---

This invention relates to a liquid cooled, liquid moderated integral nuclear reactor. In such a reactor, the pressure vessel houses a reactor core and banks of heat exchange tubes. Primary coolant is circulated in a closed path through the core and the heat exchanger banks through which secondary coolant flows in heat transfer relationship.

The present invention includes an integral nuclear reactor including a cylindrical pressure vessel having a main body portion, a secondary end portion, and a ring co-axially interposed between the portions, the ring being provided with openings through which conduits connected to banks of heat exchangers disposed within the vessel pass.

The invention also includes an assembly of banks of tubes for use in a heat exchanger in which the banks of tubes are connected to inlet and outlet conduits each passing laterally through an opening in a ring circumscribing the banks of tubes.

The invention furthermore includes a cylindrical pressure vessel including a main body portion, an end portion, a ring portion interposed between the body and the end portions, a flange extending outwardly from each of the body and end portions, means acting between the flanges at discrete locations around the pressure vessel to clamp the ring between the body and end portions, and openings extending through the ring portion and displaced circumferentially of the means acting between the flanges.

The invention moreover includes an integral nuclear reactor including a cylindrical pressure vessel having a main body portion incorporating a circumferentially extending external flange, a secondary end portion with a circumferentially extending external flange, a ring co-axially positioned between the portions, the ring being provided with openings forming passages through which all the conduits leading to and from heat exchanger tube banks disposed within the vessel pass and bolt means co-acting with the flanges to clamp the ring between the portions.

Figure 1:
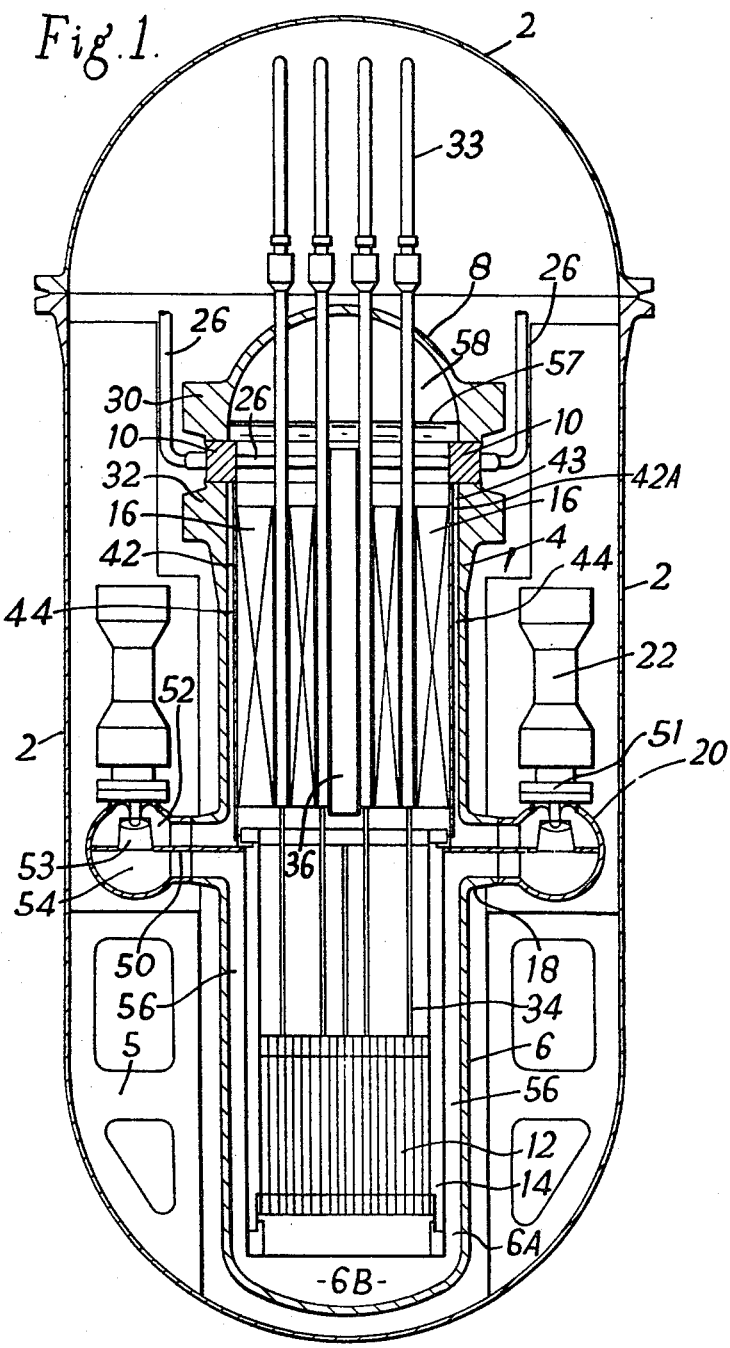
Figure 2:
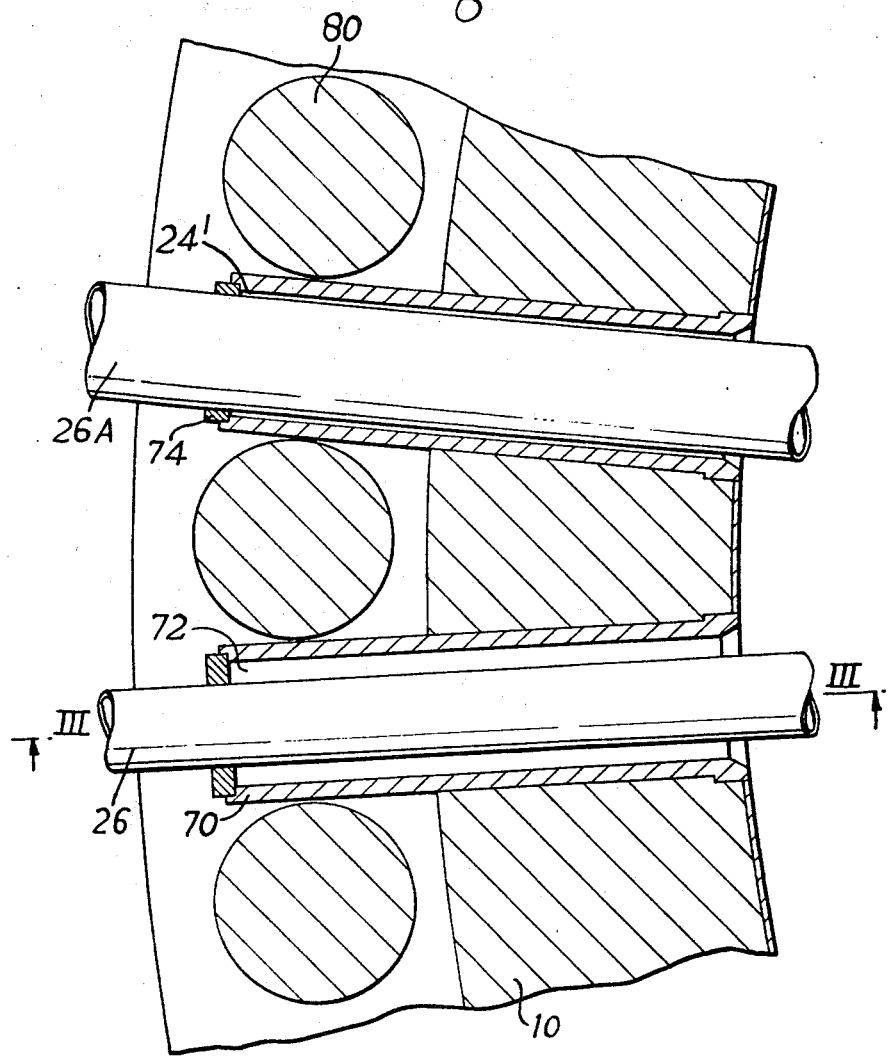
Figure 3:
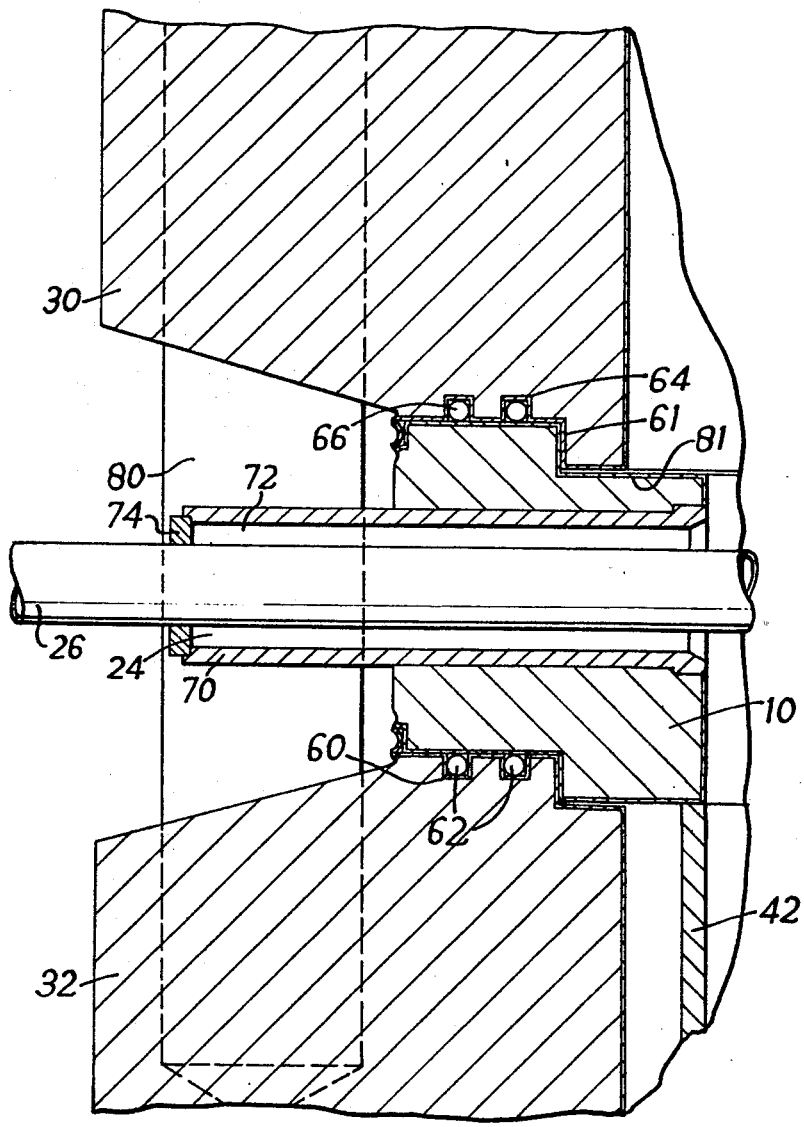

An embodiment of the invention will now be described, by way of example, with reference to the accompanying drawings in which:

FIGURE 1 is an axial section of an integral nuclear reactor embodying the invention,
FIGURE 2 is a fragment of FIGURE 1 in sectional plan on an enlarged scale, and
FIGURE 3 is a section taken on the line III—III of FIGURE 2.

The reactor shown in FIGURE 1 includes a containment vessel 2 housing a cylindrical pressure vessel 4 disposed on a common axis and provided with external apertured bracket members 5 for supporting the pressure vessel 4 within the containment vessel. The pressure vessel 4 has a main body portion 6 and an end portion 8, and includes between the ends of the main body portion 6 and the end portion 8 a ring 10 co-axially interposed between the ends. The ring will be described in detail later.

A nuclear reactor core 12 is encircled by a casing 14 formed by neutron shielding material and is disposed co-axially with respect to the longitudinal axis of the pressure vessel 2 and is spaced from the wall of the vessel to form an annular space 56 forming part of a flow path for the primary coolant. The casing 14 is disposed in a lower end part 6A of the main body portion 6 and is spaced from the bottom of the pressure vessel wall by a turning space 6B for the primary coolant.

Spaced above the core 12 are banks 16 of heat exchange tubes. Details of the heat exchanger tube arrangements will be given later. The banks 16 of the heat exchange tubes are enclosed within a cylindrical casing 42 which is coaxially disposed and spaced with respect to the pressure vessel 4. An annular space 44 is formed between the casing 42 and the inner wall of the pressure vessel to provide a further part of the primary coolant flow path. One end 42A of the casing 42 is welded to the ring 10, and the opposite end is in sealing engagement, through L-shaped collar 51, with the casing 14 circling the fuel element assembly. Apertures 43 formed in the casing 42 enable the primary coolant to flow to the annular space 44 from within the casing 42.

Lateral ducts 18 are formed in the side-wall of the body of the pressure vessel 2 extending to respective housings 20 for motor driven rotary pumps 22 used for effecting circulation of primary coolant. Each lateral duct 18 is partitioned by a peripheral flange 50 to define a suction zone 52 and a discharge zone 54, each pump 22 being supplied with fluid from the suction zone 52 are discharging into the discharge zone 54 through an aperture 53 in the flange. The flange 50 not only divides each duct 18 but includes an annular portion from which the parts dividing the ducts 18 extend outwardly. The annular portion is secured around its periphery to the pressure vessel whilst its inner periphery engages and supports the casing 14 through the intermediate of the L-shaped collar 11.

By use of the rotary pumps 22 primary coolant is circulated in a closed flow path and flows from the discharge zone 54 through the annular space 56 and the turning space 6B to the core 14 from which it abstracts heat and gives it up on its further passage through the banks 16 of the heat exchanger tubes and thence flows through the apertures 43 into the annular space 44 and on to the suction zone 52 of the duct 18 for further recirculation.

The end portion 8 is provided with a flange 30 and the main body portion 6 is provided with a corresponding flange 32. The flanges extend outwardly and are respectively located on the upper end of the main body portion 6 and the lower end of the end portion 8.

A control rod operating assembly 33 for the insertion and withdrawal of control rods 34 into and out of the core 12 is provided and passes through openings formed in the end portion 8.

A pressuriser duct 36 extends upwardly from above the core through the banks 16 of the heat exchanger tubes and discharges into a head of coolant, the free coolant level 57 forming the lower limit of a vapour space 58 acting as a pressuriser space for the coolant.

The ring 10 is formed with forty-four uniformly spaced openings 24 each, as is shown in detail in FIGURES 2 and 3 being disposed radially. The openings from passages for conduits 26 and 26A conveying feed water and steam respectively to connect up with the banks 16 of heat exchanger tubes.

Each opening 24 is provided with a stainless steel thermal sleeve 70 which has an inner diameter larger than the diameter of the corresponding conduit 26 or 26A, and defined with the conduit, an annular space 72. The annular space 72 is packed with an insulating material.

Each thermal sleeve at its end adjacent the inner surface of the ring is welded to the wall of the ring. The thermal sleeve projects beyond the outer surface of the ring 10 and is seal welded to a collar 74 which in turn is welded to its corresponding conduit. The thermal sleeve may likewise also project beyond the inner surface of the ring 10.

The conduits 26 and 26A extend radially, and each feed-water conduit has an adjacent steam discharge conduit. In this particular embodiment, the 44 openings enable the twenty-two feed water conduits and the twenty-two steam discharge conduits to be spaced uniformly and radially around the circumference of the ring 10. Moreover the feed-water conduits and the steam discharge conduits are arranged alternately and each conduit has a header (not shown) from which the banks 16 of the heat exchanger tubes extend.

The ring 10 through which the conduits 26 and 26A pass, has a stepped part $6^1$ and $8^1$ at the ends of the body portion 6 and the end portion 8 respectively of the pressure vessel 4. Since the intended use of the reactor shown in the drawings is for ships and floating vessels, the steps would accommodate lateral thrusts and help to maintain the ring 10 in portion.

A pair of annular grooves 60 is provided at the end of the body portion 6. Each groove forms a housing for a metallic O sealing ring 62, preferably of stainless steel. A similar pair of annular grooves 64 at the end of the end portion 8 houses O metallic sealing rings 66.

The end portion 8, the ring 10 and the body portion 6 are secured together by means of bolts 80 which extend through the flange 30 and into the flange 32. Each bolt passes between adjacent conduits 26 and 26A. Additionally, the ring 10 is provided at each end with a membrane 84 seal welded to the pressure vessel 4. Since it is necessary to obtain access to the space within the lid at very infrequent intervals the ring is provided with the membranes seal welded to the pressure vessel 4.

The entire internal surface of the pressure vessel 4, including the co-operating faces of the ring 10, the ends of the body portion 6 and the end portion 8, is lined with stainless steel cladding.

Referring to the banks 16 of the heat exchanger tubes, in this particular embodiment it is preferred to use helical tubes. As mentioned earlier, the conduits 26 and 26A alternate, and each pair of conduits constituted by an adjacent feed water conduit and a steam discharge conduit extend to the respective headers of the banks 16 of the heat exchanger tubes. Each helical tube circuit (not shown) will extend from the header of the feed water conduit 26A and after about two helical downwardly winding convolutions form an upriser to connect with its associated header of the steam discharge conduit 26. A plurality of such tube circuit will extend in parallel from a feed water inlet conduit and return to its associated steam discharge conduit to form a bank of heat exchanger tubes. In an alternative form of tube banks, each such helical tube after about one and half convolutions directed downwardly will reverse in an upwardly directed convolution and connect up with its associated steam discharge conduit. Such parallel helical tube circuits are generally referred to as "bent hair pin" type of helical tubes for use in bent exchanger banks. Variations and modifications of banks of heat exchanger tubes are possible.

In operation, the pressure vessel 4 is filled with water to the level 57 in the vapour space 58 in the end portion 8. The control rods 34 are wholly or partly withdrawn from the core 12 to permit the generation of heat by nuclear reaction within the fuel element assembly. The water is circulated by the two circulating pumps upwardly over the core and banks 16 of the heat exchanger tubes and through the apertures 43 and then downwardly in the annular space 44 to the suction zone 52 of the pump chamber 20. From the pump chamber the primary coolant flows out through the discharge zone 54 through the annular space 56 to the base of the pressure vessel 4 and the turning space 6B, there changing direction to flow upwardly again through the core 12.

In order to gain access to the core within the pressure vessel, the bolts connecting the flanges are removed, the membranes seal welded between the ring 10 and the pressure vessel is broken and the end portion 8, the ring 10 and heat exchangers 16 removed to permit immediate access to the fuel element assembly within the lower portion of the pressure vessel.

What is claimed is:

1. An integral nuclear reactor for marine service comprising an upright closed pressure vessel having a substantially cylindrical body portion and a removable end portion, a reactor core housed within said pressure vessel, a heat exchanger disposed within said pressure vessel, means for circulating a primary fluid within said pressure vessel to transfer heat generated by said core to said heat exchanger, means for circulating a secondary fluid through said heat exchanger in indirect heat exchange relation with said primary fluid, and means for passing said secondary fluid between the outside of said pressure vessel and said heat exchanger, said last named means including a ring coaxially disposed between said body portion and said end portion, said ring having a stepped cross-section to accommodate lateral thrust, means defining spaced openings formed through said ring, and conduits disposed within and passing through said openings and being connected to said heat exchanger in fluid flow communication.

2. A nuclear reactor according to claim 1 wherein said body portion and said end portion are each formed with a circumferentially extending external flange, and means coacting with said flanges are provided to clamp said ring between said body portion and said end portion.

3. A nuclear reactor according to claim 2 wherein said means coacting with said flanges includes bolts interconnecting said flanges, said bolts and said conduits being alternately disposed around the circumference of said ring.

4. A nuclear reactor according to claim 3 wherein said ring is seal welded to said body portion and said end portion.

5. A nuclear reactor according to claim 2 wherein alternate ones of said conduits around the circumference of said ring are inlet conduits and outlet conduits communicating with said heat exchanger.

6. A nuclear reactor according to claim 5 wherein the means coacting with said flanges includes bolts interconnecting said flanges, at least one of said bolts being disposed between each adjacent pair of conduits.

7. A nuclear reactor according to claim 2 wherein said openings are substantially radial with respect to the longitudinal axis of said pressure vessel.

8. A nuclear reactor according to claim 2 wherein said pressure vessel is arranged in a vertical position, and said heat exchanger is disposed above said core.

9. A nuclear reactor according to claim 5 wherein said conduits are the only means of communication of secondary fluid between the exterior of said pressure vessel and said heat exchanger.

10. The reactor according to claim 1 wherein the ring openings are uniformly spaced openings formed substantially radially through the ring, a thermal sleeve having an inner end and an outer end passes through each opening, one of the conduits passes through each thermal sleeve, the inner end of each sleeve is sealed to the ring, each sleeve has an inner diameter larger than the outer diameter of the conduit passing therethrough to define therewith an annular space, an insulating material is packed in each annular space, and the outer end of each sleeve is sealed to the conduit passing therethrough.

References Cited

UNITED STATES PATENTS

| | | | |
|---|---|---|---|
| 3,151,034 | 9/1964 | Douglass et al. | 176—65 |
| 3,254,633 | 6/1966 | Ammon et al. | 122—32 |
| 3,255,088 | 6/1966 | Sprague et al. | 176—53 |
| 3,279,439 | 10/1966 | Ammon | 122—34 |
| 3,290,222 | 12/1966 | Schoessow et al. | 176—65 |

L. DEWAYNE RUTLEDGE, *Primary Examiner.*